Aug. 10, 1937.     R. H. McKEE     2,089,616
PROCESS FOR THE HYDROGENATION AND CRACKING OF HYDROCARBON OILS
Filed Dec. 14, 1932     3 Sheets-Sheet 2

INVENTOR
Ralph H. McKee
BY H. Lee Helms
ATTORNEY

Patented Aug. 10, 1937

2,089,616

UNITED STATES PATENT OFFICE 2,089,616

PROCESS FOR THE HYDROGENATION AND CRACKING OF HYDROCARBON OILS

Ralph H. McKee, New York, N. Y., assignor, by mesne assignments, to Ernest A. Ocon, New York, N. Y.

Application December 14, 1932, Serial No. 647,131

5 Claims. (Cl. 196—53)

The object of the present invention is to provide a process and apparatus for converting hydrocarbon oils into products of lower boiling point, and one part of the invention relates to the hydrogenation of such oils.

A further object of the invention is to effect the conversion or cracking by means of steam superheated to about 2000° F.

A further object of the invention is to provide apparatus in which the high boiling residue from the first step of the treatment is returned and treated with additional steam.

A further object of the invention is to effect hydrogenation by the dissociation of water into its elements, and the combining of the nascent hydrogen with the primary product by cracking the vaporized oil under treatment and of the oxygen with the carbonaceous material to form an oxide of carbon, and thereby avoid the formation of adherent coke or carbonaceous material on the walls of the apparatus. A further object is to protect the superheating vessel and cracking vessel from corrosion by either dissolved oxygen or the oxygen of the water vapor at high temperature to which it is subjected by adding to the water being heated small amounts of oil, hydrogen or hydrocarbon gases.

A further object is to provide a process and apparatus for the above purposes which may be operated at atmospheric pressure and below 100 lbs. per square inch.

These and further objects will be hereinafter brought out in this specification.

The invention will be described with reference to the accompanying drawings, in which—

Figure 1:
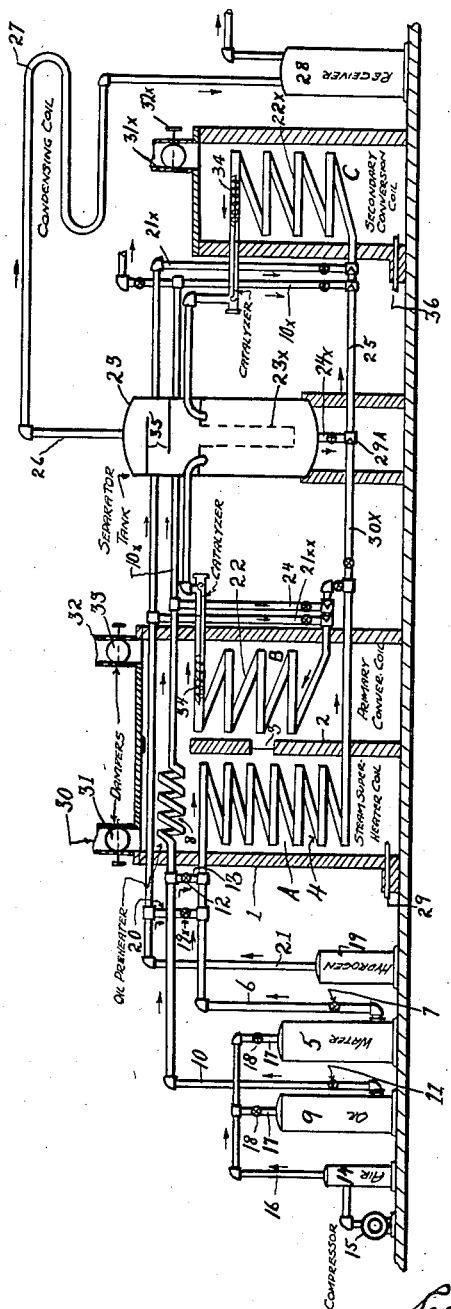
Fig. 1 is a view of sectional elevation of an apparatus for carrying the method into effect.

Referring to the drawings, I show in Fig. 1 an embodiment of the invention in which spiral coils are employed.

The kiln 1 is provided with a wall 2 having openings controlled by shutters or movable plates at 3, thus dividing the kiln into a heating chamber A and a heating chamber B. Within kiln chamber A is a spiral coil 4 which comprises a superheater for water. Water is led to coil 4 from a tank 5, via pipe 6, the latter being controlled by valve 7. Above water superheater coil 4, is a spiral coil 8 for preheating oil, the coil receiving oil from a tank 9, via pipe 10, the latter being controlled by valve 11. For a purpose hereinafter explained, communication may be effected between oil tank 9 and the inlet of water superheater coil 4 by opening of valve 12 controlling a short connecting pipe 13. The oil and water tanks 5 and 9 have pressure applied thereto from an air pressure tank 14 connected with an air pump 15, a pipe 16 leading from the air tank having branches 17 leading to the respective tanks, the branches being controlled by valves 18.

At 19, I have shown a tank for containing material such as natural gas or methane, or a gas such as hydrogen which may be admitted to the water superheater coil inlet via a pipe 20 controlled by valve 19X pipe 20 communicating with feed pipe 21 leading to the said tank 19. The material fed from tank 19 will be of such character as to be more easily oxidized than the material of coil 4, so as to protect the apparatus from corrosion due to water and/or dissolved oxygen.

The outlet of coil 4 projects within kiln chamber B and communicates with the base of a conversion or cracking coil 22, and the latter may receive at its base preheated oil from pipe 24 leading from oil preheater 8. The discharge end of coil 22 projects through a wall of the kiln and into a separator tank 23, and the latter at its base discharging through pipe 24 into a conduit 25 leading to the inlet of a conversion coil 22X, disposed in kiln C so that the liquid residual passing downward through a screen 23X in the separator tank may be again passed through a conversion zone. The condensable hydrocarbon vapors may pass upward through pipe 26 to a condenser 27 (cooling means not shown) discharging into tank 28, having an outlet pipe with valve (not shown) for conducting away the uncondensed gases under the desired operating pressure.

Kiln section A may receive heat from a burner indicated schematically at 29, the top of the kiln having a draft pipe 30 controlled by damper 31. At the top of kiln section B, may be placed a draft pipe 32 controlled by damper 33.

In the discharge end of pipe 24X is an atomizer nozzle 29A at the end of a branch pipe 30X communicating with the outlet end of water superheater coil 4 so that the residual in tank 23 may be atomized in the inlet of the conversion coil 22X. The discharge end of the latter projects within separator tank 23. Kiln C may have a draft pipe 31X controlled by damper 32X.

Tank 19, which will hereinafter be called the hydrogen tank, communicates with the inlet of conversion coil 22X via branch pipes 21X controlled by a suitable valve, and oil preheater coil 8 communicates with the inlet end of conversion coil 22X via branch pipes 10X. The hydrogen tank also communicates with the inlet end of conversion coil 22 via branch pipes 21XX.

In the practice of my method, employing the apparatus in Figure 1, water is fed through superheater coil 4 and heated therein to a high temperature, for example, 2000° F. at or near the outlet of the coil. Into the superheater coil may be fed a very small amount of hydrogen gas, such as methane or ethylene gas, or oil via pipes 20 and 21, or 13 in order to prevent oxidation of the coil by water and/or dissolved oxygen due to the high degree of heat to which the water is subjected. For example, one cubic foot of hydrogen to one hundred gallons of water reduces the amount of free oxygen by a combination of part thereof with the hydrogen, and also retards formation of iron oxide when an iron coil is used. The methane and ethylene gas are oxygen reducing agents, the resultant being carbon monoxide.

Oil from tank 9 is fed to the preheater 8 and meets the superheated steam at the inlet of conversion coil 22 so that the steam and oil are mixed at the lower point of the coil, the latter being made of considerable capacity in order that a time element of considerable character will exist. For example, the conversion coil 22 may be but half as long as water coil 4 but have a cross section area of four to eight times that of coil 4. (For simplification in the figures all pipes are indicated as of the same diameter.) The oil fed to conversion coil 22 may be at 700–800° F., and so when mixed in approximately equal weights with the superheated steam at near 2000° F., the contents of the conversion coil will be approximately 1200° F., allowance having been made for the necessary heat losses.

Kiln section B, in which the conversion coil is located, may be heated by hot gases from kiln section A. In starting the process, the shutters 3 may be opened so that the hot gases may transmit heat to the conversion coil until it reaches the desired temperature. A draft may be effected by opening draft damper 33 until the desired heat is reached, whereupon it may be closed. Damper 31 may remain closed when damper 33 is open. Throughout the operation of the process, the shutters 3 may be opened in part so that the desired amount of hot gases can pass into kiln section B from highly heated section A, thereby compensating for any loss of heat from kiln section B by radiation, conduction, or convection. If desired, a small burner (not shown) may be placed within kiln section B, but ordinarily, it will not be required.

It is to be noted that the conversion coil 22 may contain a catalyst as indicated at 34 and a similar catalyst may be contained within coil 22X. The catalyst may be wire mesh of nichrome, an iron chromium nickel alloy or any other suitable catalyst such as tungsten oxide, molybdenum oxide, metallic nickel, etc. may be employed in substitution for nichrome. The said metallic alloys are exclusively catalysts of hydrogenation and the recited oxides are catalyzers of hydrogenation and desulfurization.

It will be noted from the above that the cracking or conversion of the oil is effected from heat derived from the superheated steam and within the conversion coil. Although hydrogenation of a portion of the petroleum will be effected by the action of hydrogen from the water vapor at the temperature indicated, added hydrogen may be supplied from tank 19, or some other suitable source, if desired.

The treated vapors pass from conversion coil 22 to the separator tank 23. Separation of the vapors is permitted by the baffles 35 in the upper part of the chamber. Larger particles of carbon, if any, will not pass through the screen, indicated by dotted lines 23X, but will be held up. The high boiling residual oil will pass through the screen and pass downward into pipe 24 where it will pass to the second cracking or conversion coil 22X, together with superheated steam (and hydrogen, if desired), and, in some cases, fresh oil may be admitted to the conversion coil 22X through the pipe connections 10X. The coil 22X may receive heat from the burner indicated at 36. Like coil 22, it should preferably be of large cross sectional area. By this method, the condenser receives only low boiling material, such as, water, motor fuel, some kerosene and some gas.

The conversion coils 22, 22X are protected due to the fact that the heat for conversion or cracking is not applied to the exterior of the coil and conducted therethrough, but is furnished by the superheated steam. This prevents adherence of carbon to the coil and indefinitely long life for such a coil. The coils, not being supplied with any large amount of heat externally, are protected from exterior corrosion, and have increased life from that standpoint.

The process may be carried out so that the conversion coil or coils may be under either atmospheric pressure, or but a few atmospheres above it, say 50–100 lbs.

No condensers or refining apparatus are shown with exception of schematic condenser 27, because these may be of standard type and are not part of the invention. The same applies to pumps, indicating devices, etc., which are not illustrated, but are understood to be present and used where required.

Figure 2:
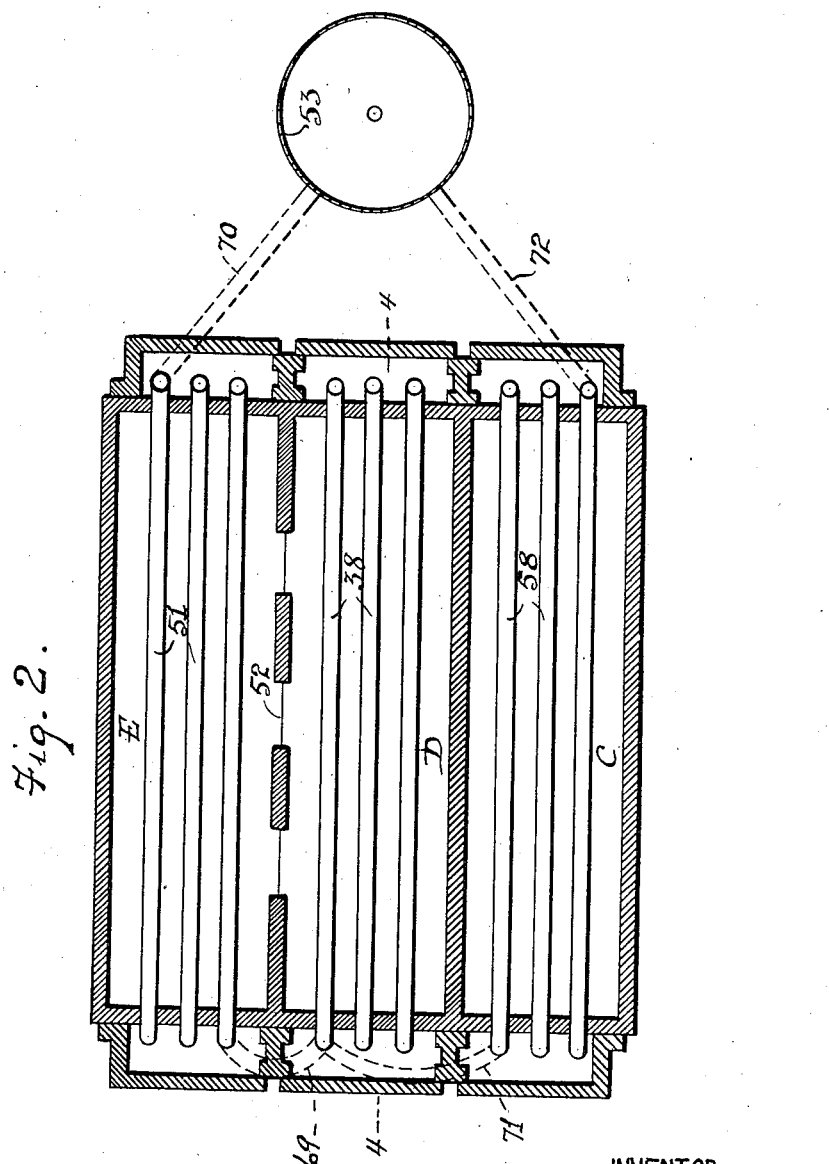
Fig. 2 is a sectional plan view of a heat treating kiln having a plurality of compartments for enclosing the water super-heating tubes, the oil preheating tubes and the conversion or cracking tubes for the combined oil and water vapors, together with a separator for residue to be recycled.

In Figure 2, I have shown in horizontal section a coil containing structure comprising compartments for receiving the water superheater, oil preheater, primary conversion-cracking coil and the secondary conversion cracking coil.

In the use of the word coil, I mean a single coil structure, or a plurality of such structures. In Figure 2, I have shown three parallel coil structures 38 within kiln chamber D and it may be assumed that they are water superheater coils. In chamber C are shown three sets of secondary conversion coils 58, and in chamber E are shown three sets of primary conversion coils 51. Shutters 52 in the wall separating chambers D and E permit the passage of hot gases to chamber E, and the wall separating chambers D and C will be heated by convection and radiation, although shutters may be placed in that wall also. The dotted lines 69 indicate communication between the mutually interconnected primary conversion-cracking coils 51 and the superheated steam coils 38, and the dotted lines 70 indicate communication between the primary conversion coils and the separating tank 53. The dotted lines 71 show the superheated steam connection intermediate the superheater coils 38, and secondary conversion-cracking coils 58. The dotted lines 72 show the discharge conduit from the secondary coils to the separating tank.

Figure 3:
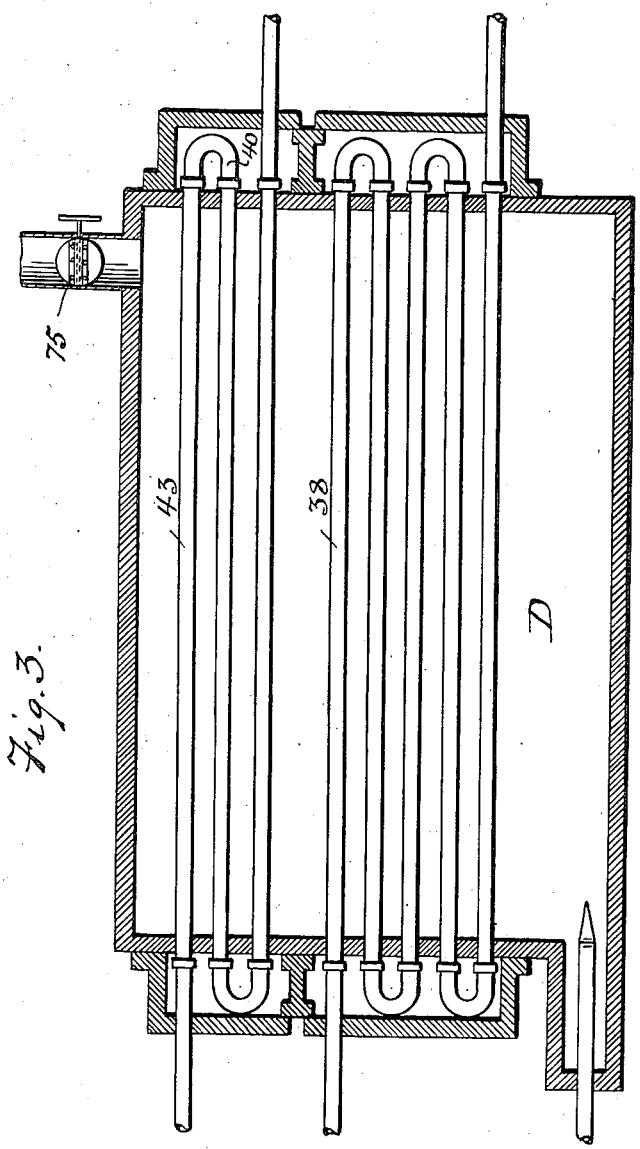
Fig. 3 is a vertical section on the line 4—4, Fig. 3.

In Figure 3, I have shown a sectional elevation, on the line 4—4, Figure 2, illustrating one coil section of the oil preheater 43, and one coil section of the water superheater 38.

The exact temperature used will depend upon the particular oil being heated. The proper choice of temperature can be easiest determined by testing the oil in accordance with the method described in my Critical Temperatures and Oil Cracking, with H. H. Parker, published in Industrial and Engineering Chemistry, vol. 20, page 1169, in 1928.

For a large unit plant, the superheater 38 may be replaced by a water tube type boiler, and it will be understood that the structure shown in the drawings is largely schematic and may be substantially altered in form without departing from the spirit of the invention.

In the process, a desired product such as motor fuel or fixed gas may be obtained from the primary and secondary conversion coils, or gasification in one of the coils, of all or part of the oil fed it, whichever is desired, and in accordance with the temperatures employed in the coils. The higher the temperature, the greater the proportion of fixed gas produced.

In the process, petroleum residuals, refinery slops, shale oil, fuel oils, oils derived from liquefied coal, and crude petroleum can all be used as raw stock with high efficiency, and the process is flexible to meet the requirements of any particular charging stock employed.

Having described my invention, what I claim and desire to secure by Letters Patent, is as follows:

1. A process of converting hydrocarbon oils of relatively high boiling point into liquid products of low boiling point, which consists in preheating the liquid oil to a low cracking temperature for a period insufficient to permit substantial cracking, thence subjecting the incompletely cracked products without separation of vapors from liquids to direct contact with steam superheated in the presence of an added hydrogenous reducing agent at above 1400° F., and thereby avoiding the passage of free oxygen to the oil, maintaining the steam and oil in such contact for duration sufficient to crack the oil and cause the oil to react with a portion of the steam, and separating the light fractions, thus produced, from the residue.

2. A process of converting hydrocarbon oils of relatively high boiling point into liquid hydrocarbon products of low boiling point, which consists in subjecting the liquid oil to a low cracking temperature of about 800° F. in a restricted stream by indirect heat exchange with an external heating medium, passing the preheated oil in a restricted stream through a vapor phase cracking and hydrogenating zone, supplying heat for the reaction in said zone entirely by addition of a quantity of steam superheated to a temperature above the vapor phase reaction temperature and about 2000° F. whilst the materials are kept externally heated to prevent heat loss, a catalyst of the hydrogenation type being located in the path of the restricted vapor stream, maintaining the steam and oil in such contact and temperature for a duration sufficient to crack the oil and decompose a portion of the steam by reaction with the oil vapors, and separating the light fractions thus produced from the residual.

3. A process of converting hydrocarbon oils of relatively high boiling point into liquid hydrocarbon products of low boiling point which consists in subjecting the liquid oil to a low cracking temperature of about 700–800° F. and under pressure below 100 pounds per square inch in a restricted stream by indirect heat exchange with an external heating medium, passing the preheated oil in a restricted stream through a vapor phase cracking and hydrogenating zone, supplying the heat for the reaction substantially entirely by addition of a quantity of steam superheated to a temperature above the vapor phase reaction temperature, while the materials are kept externally heated only to prevent heat loss, the steam having been superheated to a temperature substantially above 1400° F. in the presence of a hydrogenous reducing agent, maintaining the steam and oil in such contact and temperature for a duration sufficient to crack the major part of the oil and cause the oil to react with a portion of the steam, and separating the light fractions thus produced from the residual.

4. A process of converting hydrocarbon oils of relatively high boiling point into liquid hydrocarbon products of low boiling point which consists in subjecting the liquid oil to a low cracking temperature of about 800° F. and under pressure below 100 pounds per square inch in a restricted stream by indirect heat exchange with an external heating medium, passing the preheated oil in a restricted stream through a vapor phase cracking and hydrogenating zone, supplying the heat for the reaction substantially entirely by addition of a quantity of steam superheated to a temperature above the vapor phase reaction temperature, while the materials are kept externally heated only to prevent heat loss, the passage of the oil and steam in said restricted stream being for a duration sufficient to crack the major portion of the oil and cause the same to react with a portion of the steam, the steam being superheated to a temperature substantially above 1400° F. in the presence of an added hydrogenous reducing agent and thereby avoiding the passage of free oxygen to the oil, and separating the light fractions thus produced from the residual.

5. A process for the conversion of hydrocarbon oil of relatively high boiling point into lower boiling point products by preheating the oil to a low cracking temperature of about 700°–800° F., passing the preheated oil in a restricted stream through a vapor phase cracking and hydrogenating zone, supplying the heat for the reaction by means of heat applied within the vapor phase cracking and hydrogenating zone for the oil by injecting superheated vapor comprising steam at about 2000° F. into the preheated oil, the oil being in the presence of a catalyst of the hydrogenation type, the superheated vapor being in such quantity that the preheated oil is raised to its cracking temperature, the commingled vapors being led through said vapor phase cracking zone whilst the latter is subjected externally to a heat supply sufficient to prevent substantial loss of heat within its confining envelope, but not to produce cracking and for a duration sufficient to effect cracking of the major portion of the oil and decomposition of a portion of the steam by the oil, and separating the light fractions thus produced from the residual.

RALPH H. McKEE.